United States Patent [19]

Stern

[11] Patent Number: 5,226,124
[45] Date of Patent: Jul. 6, 1993

[54] COMMUNICATION INTERFACE BETWEEN A RADIO CONTROL TRANSMITTER AND A COMPUTER DATA BUS

[75] Inventor: David R. Stern, Hinsdale, Ill.

[73] Assignee: Ambrosia Microcomputer Products, Inc., Hinsdale, Ill.

[21] Appl. No.: 710,469

[22] Filed: Jun. 5, 1991

[51] Int. Cl.⁵ .................. G06F 3/00; G06F 13/00
[52] U.S. Cl. .................. 395/325; 395/250;
341/176; 340/825.69; 364/939; 364/932.8;
364/927.92; 364/DIG. 2; 364/926.3
[58] Field of Search .......... 364/DIG. 1 MS File,
364/DIG. 2 MS File, 480, 486, 487, 488;
395/325, 250, 275, 775, 375, 100; 341/176;
340/825.69, 825.72; 455/91; 370/85.1, 110.1;
342/195; 446/454; 273/438; 358/194.1

[56] References Cited

U.S. PATENT DOCUMENTS

| | | | |
|---|---|---|---|
| 4,377,843 | 3/1983 | Garringer et al. | 364/200 |
| 4,393,464 | 7/1983 | Knapp et al. | 395/800 |
| 4,462,080 | 7/1984 | Johnstone et al. | 364/513.5 |
| 4,843,544 | 6/1989 | DuLac et al. | 364/200 |
| 4,868,780 | 9/1989 | Stern | 364/900 |
| 4,929,949 | 5/1990 | Yamamoto et al. | 341/176 |
| 4,935,894 | 6/1990 | Ternes et al. | 395/325 |
| 4,999,807 | 3/1991 | Akashi | 395/775 |
| 5,010,480 | 4/1991 | Natarajan | 364/200 |
| 5,019,964 | 5/1991 | Yamamoto et al. | 395/250 |
| 5,019,980 | 5/1991 | Starr et al. | 364/424.04 |
| 5,045,997 | 9/1991 | Watanabe | 364/200 |
| 5,101,197 | 3/1992 | Hix et al. | 340/784 |

OTHER PUBLICATIONS

"Digital Data System Channel Interface Specification", Bell System Technical Reference, Pub. 62310, Sep. 1983.

*Primary Examiner*—Michael R. Fleming
*Assistant Examiner*—Gopal C. Ray
*Attorney, Agent, or Firm*—Robert J. Black

[57] ABSTRACT

An interface circuit for use between a radio control transmitter equipped with joysticks and a standard data bus of a personal type computer. The interface circuitry includes a microcontroller operated as a reformatter for signals received from the remote control transmitter and a number of integrated circuit latch and buffer circuits connected between the output of the microcontroller and the data bus of a computer to convert the signals output from the microcontroller to the data bus on a direct basis.

11 Claims, 1 Drawing Sheet

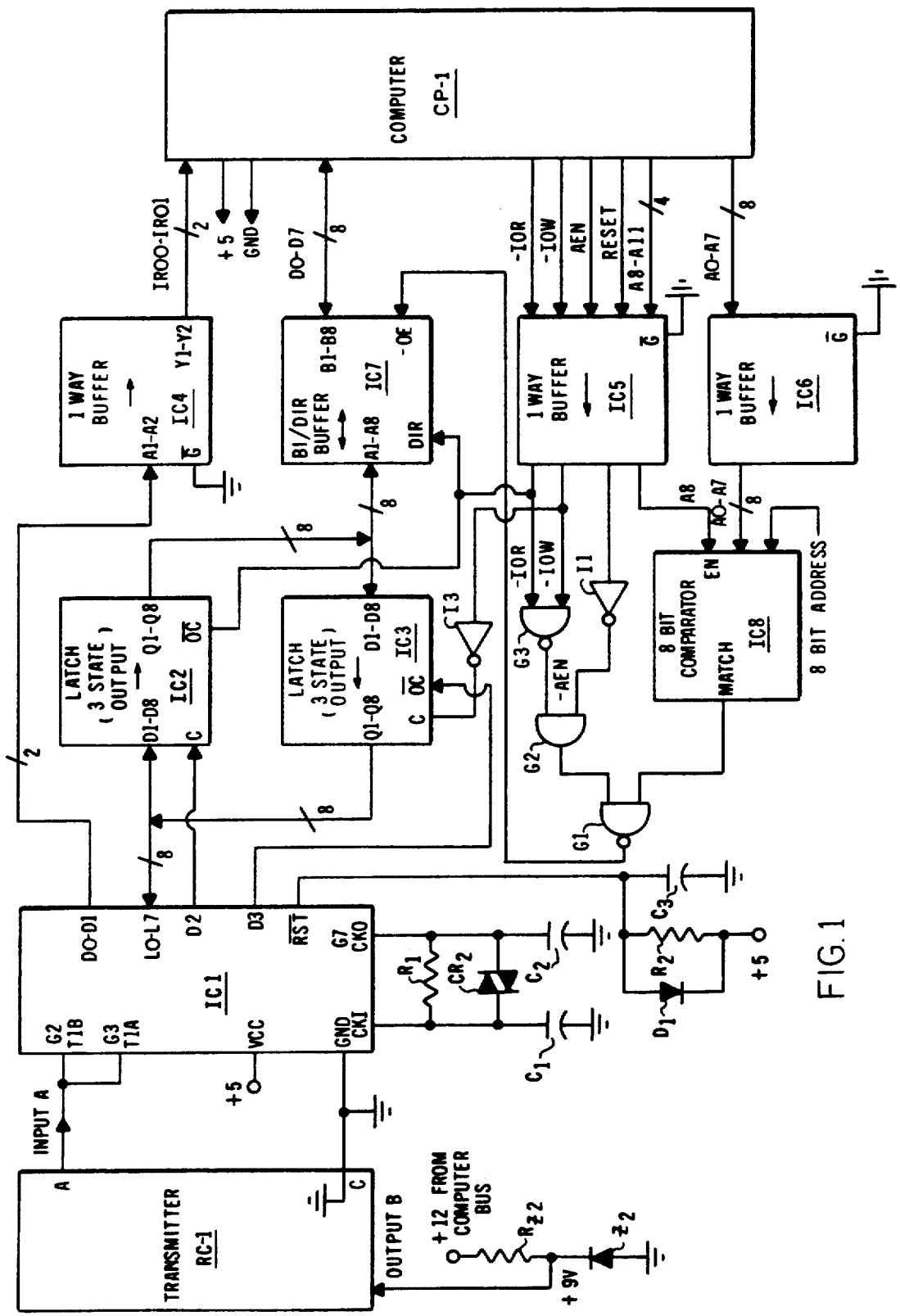

COMMUNICATION INTERFACE BETWEEN A RADIO CONTROL TRANSMITTER AND A COMPUTER DATA BUS

BACKGROUND OF THE INVENTION

1. Field of the Invention

The present invention pertains to remote control transmitters normally used together with associated receivers and servos to remotely control models such as airplanes, helicopters, boats, etc. More particularly, the invention pertains to an interface circuit arrangement for use between a radio control transmitter and the data bus of a computer.

2. Background Art

Computer systems today utilize many different methods of receiving information from the user. Such methods include serial input/output ports, parallel input/output ports, with parallel and input referring to the sequence of information passed to the computer. Keyboards, bus expansion slots, cartridge slots, mouse ports, and joystick ports are also utilized.

Radio control (R/C) transmitters have been used together for many years with associated receivers and servos mechanisms to remotely control models of all types, including cars, airplanes, helicopters, and boats. Such remote control transmitters are widely used and available on a world-wide basis. Such units include many controllable inputs built into their basic circuitry, including switches, buttons, potentiometers, and multiple axis joysticks with trim adjustment. In addition, most radio control transmitters offer many built in user adjustable features such as adjustable control response curves, multiple setups for different vehicles, various control mixing and channel assignments, etc.

In the past, it has been possible for dedicated joysticks and switches to be interfaced into a computer. One example of this arrangement was taught in my U.S. Pat. No. 4,868,780 which issued on Sep. 19, 1989 and is assigned to the same assignee as the present application.

Accordingly, an interface that would allow an already available remote control transmitter equipped with joysticks and switches to be used as a computer input device would be most cost effective. Additionally, another advantage would be present if the user of the arrangement could use his own remote control transmitter, with its built in features, to control a computer simulation of the aircraft, car, or boat. Thus the training and learning value and familiarization with the equipment would be substantially enhanced in the simulation arrangement. Accordingly, it is the object of the present invention to allow existing joysticks and other controls included in remote control transmitters to be used for computer input.

One form of this interface is disclosed in my copending application, Ser. No. 07/565,462, entitled INTERFACE BETWEEN A RADIO CONTROL TRANSMITTER AND A COMPUTER, filed on Aug. 10, 1990.

SUMMARY OF THE INVENTION

In order to permit the owner of an available remote control transmitter to utilize his transmitter with all of its controls and features as a computer input device, the arrangement set forth in the following is suggested. I believe that the utilization of an existing remote control transmitter for computer input can be done by taking an available output of the remote control transmitter and interfacing it to a computer input/output port.

Outputs available from a remote control transmitter include the following:

1) modulated radio frequency energy, and
2) encoded data from a "buddy box" connection or from a "servo test" connection. The buddy box connection of a remote control transmitter is normally used to connect two transmitters together for training. In this instance, one transmitter's radio frequency modulator is used but is driven by the encoder section of either transmitter. Remote control transmitters that include such so-called trainer or buddy box connections include the Futaba FP-5UAP, manufactured by Futaba, the model X-347, manufactured by JR, and the Vanguard VG4R, manufactured by Sanwa.

The "servo test" output is typically utilized to connect to the receiver without transmitting radio frequency energy. This output is provided to test servo operation without interfering with others utilizing the same radio frequency. A typical radio equipped with direct servo test connection facility is that manufactured by Futaba as their model FB-9VAP.

In accordance with the present invention, encoded data in a coded bit stream employing pulse position modulation or pulse code modulation from the buddy box output or servo test output is connected directly to a microcontroller for reformatting of the data available from the remote control transmitter. The microcontroller output is then stored in a latch one byte at a time after which an interrupt request is transmitted to the computer through an associated buffer. When the computer processes the interrupt signal, it then reads the contents of the latch transmitting a read signal through the interface of the present invention to the microcontroller. The microcontroller may at regular intervals read the contents to another latch to determine if the computer has transmitted any commands in the reverse direction back to the microcontroller.

DESCRIPTION OF THE DRAWING

The present invention is described in detail below with reference to the accompanying drawing wherein:

FIG. 1 is a combination block and schematic diagram of an interface circuit arrangement for use between a radio control transmitter and a computer data bus.

DESCRIPTION OF THE PREFERRED EMBODIMENT

Referring now to FIG. 1, a radio control transmitter RC1, like any of those noted above, its buddy box or servo test output is directly wired to the timer input of a microcontroller IC1, which in the present instance is found to be most easily implemented with a microcontroller such as the COP888CG single chip CMOS microcontroller manufactured by National Semiconductor. The microcontroller software utilizes the timer input from the remote control transmitter to determine the value of the data on each channel. It should be noted that the software program utilized in the microcontroller IC1 does not form a portion of the present invention, but rather it is only required that it provide the necessary function and operation as described herein.

The microcontroller IC1 software then outputs the reformatted data from outputs L0 through L7 as seen in FIG. 1. This output is then connected to the interface circuitry which shall be described in detail hereafter.

Referring now to FIG. 1, component circuitry of the interface circuitry includes integrated circuits IC5 and IC6, each of which are one-way buffers which are used to buffer address and control signals on an inward basis from the computer bus. Integrated circuit IC4 is also a one-way buffer used to buffer interrupt request signals out to the computer bus.

Integrated circuit IC7 consists of a bidirectional buffer used to isolate the computer data bus from the microcontroller IC1 data bus. Bidirectional buffer IC7 is able to set up paths in either direction or present a high impedance to both busses. Integrated circuits IC2 and IC3 are octal transparent latches. Latch IC2 is used to store one byte being transferred from microcontroller IC1 to the computer bus. Latch IC3, on the other hand, is used to store one byte being transferred from the computer bus to the microcontroller IC1 bus.

Integrated circuit IC8, an eight bit comparator, compares from the address present on the bus addresses designated A0 through A7 as buffered by one-way buffer IC6 by way of lead input A8 buffered by one-way buffer IC5 with a card address which may be hard wired or settable with external switches not shown. This then forms the address that the computer uses to communicate with the interface of the present invention when it performs either an I/O (input/output) read or I/O write within the interface. NAND gate G3 outputs a 1 or true signal when the following condition is met: either IOR or IOW inputs. Similarly, AND gate G2 outputs a true or 1 signal when the IOR or IOW inputs are present as well as a −AEN signal. Subsequently, NAND gate G1 outputs as 0 or false output when the following conditions are met: IOR or IOW and −AEN and matching of the address bus with that of the interface address. This condition occurs when a computer is accessing the interface circuitry. It should be noted that IOR=I/O read, and IOW=I/O write, AEN=address enable signal. A −AEN or AEN not signal is required because the address enable has to be false to ensure that direct memory access is not taking place.

The 0 output present at NAND gate G1 activates the −OE (output enable signal) input of bidirectional bus buffer IC7. The direction of the data transfer through bidirectional buffer IC7 is determined by the −IOR signal from one-way buffer IC5 directly into bidirectional buffer IC7's DIR input. The I/O write signal (IOW) from the computer bus through one-way buffer IC5 connected the C input or latch control of latch IC3 through inverter I3. Likewise, the IOR or I/O read signal from the computer bus through one-way buffer IC5 is connected to the −OE or output enable input of latch IC2. This I/O read output IOR is also connected to one input of gate G3.

From the foregoing it will be obvious that the circuit consisting of buffers IC5, IC6, IC7 and comparator IC8, along with gates G1, G2, G3 and inverter I1 are used to detect the input/output read or input/output write signal from the computer bus to the interface of the present invention and to set up and enable the data path to or from the interface of the present invention and to provide control signals to read from or write to latches IC2 and IC3.

It will be seen that latch IC2 is used essentially as a storage buffer for data going from microcontroller IC1 to the computer bus through bidirectional buffer IC7. On the other hand, latch IC3 is utilized as a storage buffer for data coming from the computer bus through bidirectional buffer IC7 and going to the microcontroller IC1. From the foregoing it will be obvious that latch IC2 is loaded from microcontroller IC1 via data signals L0 through L7 and integrated circuit microcontroller IC1 output D2 is used to latch the data into latch IC2 under control of microcontroller IC1.

Likewise latch IC3 is loaded by the computer input/output write signals by way of addressing the interface circuitry. In that particular case, bidirectional buffer IC7 is enabled so that buffer IC7's direction brings data from the computer bus and places it on latch IC3 inputs D1 through D8. The IOW signal to input C of latch IC3 latches the data from the computer bus into latch IC3.

It can be seen that latch IC2 is read by a computer input/output read signal to the address of the interface so that in that case buffer IC7 is enabled so that buffer IC7 passes data in a direction from outputs Q1 through Q8 of latch IC2 through buffer IC7 inputs A1 through A8 and then via buffer IC7 outputs B1 through B8 to the computer bus shown as D0 through D7. For signals in the opposite direction, latch IC3 is read by the microcontroller IC1 by the following sequence of operations. IC1 output D3 is first set to 0. This input to the −OC (output control input) of latch IC3 places the latches data on latch outputs Q1 through Q8. Microcontroller IC1 can now read in this data from ports L0 through L7.

From the foregoing it will be obvious that the above described ability to transfer data from the computer bus to a microcontroller is facilitated by the interface circuitry of the present invention. As described, the computer facilitates control operation of the invention in a manner similar to the manually operated switches S1 through S4 as shown in FIG. 1 of my aforementioned co-pending application.

It should also be noted that the above described ability to transfer data from the microcontroller to the computer bus by way of the present interface allows the computer receiving the data originating in the remote control transmitter RC1 in a manner similar to that of the function described for a serial interface (Q1, Q2, R3, R4 and R5) of the aforementioned co-pending application.

Finally, the normal mode of operation will be for the microcontroller IC1 to input a pulse stream from the remote control transmitter, reformat the data, then output and latch the data one byte at a time to latch IC2. When the data is latched in IC2 the microcontroller sends an interrupt request (output D0) to the computer through buffer IC4. When the computer processes this interrupt, it reads the contents of latch IC2 by outputting an IOR or input/output read signal to the interface circuitry of the present invention. Likewise, microcontroller IC1 will at regular intervals read in the contacts of latch IC3 to determine if the computer has transmitted any commands back to the microcontroller.

Power (battery and ground) for the interface of the present invention are derived from the computer bus. It should also be noted that the present interface could be included within the remote control radio transmitter.

While but a single embodiment of the present invention has been shown, it will be obvious to those skilled in the art that numerous modifications may be made without departing from the spirit of the present invention which shall be limited only by the scope of the claims appended hereto.

What is claimed is:

1. An interface circuit for use between a radio control transmitter equipped with encoded signal outputs and a computer data bus, said interface circuit comprising:
- a microprocessor including incoming circuit connections from said radio control transmitter encoded signal outputs;
- a first latch including incoming circuit connections from said microprocessor;
- a second latch including outgoing circuits to said microprocessor;
- a bidirectional buffer including incoming circuit connections from said first latch and including outgoing circuit connections to said second latch, said bi-directional buffer further including bidirectional circuit connections to said computer data bus; and
- a first one-way buffer including incoming circuit connections from said computer data bus and an outgoing circuit connection to said bidirectional buffer, said first one-way buffer operated in response to signals received from said computer via said data bus to control the direction of flow of information through said bidirectional buffer from said first latch to said computer data bus or in the alternative from said computer bus to said second latch.

2. An interface circuit as claimed in claim 1 wherein:
- there is further included a second one-way buffer including circuit connections from said computer data bus; and
- a logic circuit including incoming circuit connections from said first and second one-way buffers and including outgoing circuit connections to said bidirectional buffer, operated in response to incoming signals from said computer data bus to enable the transmission of information through said bidirectional buffer.

3. An interface circuit as claimed in claim 1 wherein:
- there is further included a one-way outgoing buffer including an incoming circuit connection from said microprocessor and an outgoing circuit connection to said computer data bus, said one-way outgoing buffer operated to transfer interrupt signals from said microprocessor to said computer data bus, said interrupt signal indicative of an indication by said microprocessor as ready to transmit information to said computer.

4. An interface circuit as claimed in claim 2 wherein:
- said logic circuit further includes a comparator circuit comparing signals received over incoming circuit connections from said one-way buffers and from an eight bit address source; and
- said logic circuit operated in response to an output signal from said comparator circuit and said incoming signals from said computer bus to control transmission of information through said bidirectional buffer.

5. An interface circuit as claimed in claim 1 wherein:
said second latch further includes an incoming circuit connection from said microprocessor.

6. An interface circuit as claimed in claim 1 wherein:
said outgoing circuit connection from said first one-way buffer further connects to said first latch to extend signals to control the output of said latch.

7. An interface circuit as claimed in claim 1 wherein:
operating power for said interface circuit is derived from said computer bus.

8. An interface circuit as claimed in claim 3 wherein:
said interface circuit is operated in response to an interrupt circuit from said microprocessor transmitted via said one-way outgoing buffer to said computer data bus to control the direction of information coupled through said bidirectional buffer bus in response to signals received back from said computer bus to said first incoming buffer circuit.

9. An interface circuit as claimed in claim 1 wherein:
said radio control transmitter includes a trainer output connected to said microprocessor's timer input to determine the value of data transmitted from said radio control transmitter to said interface circuit.

10. An interface circuit as claimed in claim 1 wherein:
said radio control transmitter transmits data to said interface circuit in a coded bit stream employing pulse position modulation, or in the alternative employing pulse code modulations.

11. An interface circuit as claimed in claim 1 wherein:
said interface circuit is included in said radio control transmitter.

* * * * *